2,904,520

PREPARATION OF ACTIVE CONTACT MASSES FROM KAOLIN CLAYS

Joseph J. Donovan, Swarthmore, and Thomas Henry Milliken, Jr., Moylan, Pa., assignors to Houdry Process Corporation, Wilmington, Del., a corporation of Delaware No Drawing. Application May 16, 1955
Serial No. 508,798

16 Claims. (Cl. 252—450)

The present invention relates to the activation of clays and is particularly concerned with the preparation therefrom of catalysts of desired physical strength having enhanced activity for cracking and other catalytic conversion of hydrocarbons.

Conventional methods in commercial use for preparing catalysts of desired activity as well as useful decolorizing agents from sub-bentonite clays of the montmorillonite family involve leaching of the clay with aqueous mineral acid at about 200° F. thereby effecting removal of a portion of the alumina content of the clay and simultaneous removal of part of the acid-soluble undesirable components therefrom such as iron and alkali metal compounds. This procedure has also been applied in the attempted activation of clays of the kaolin family, but catalysts having the desired stable activity and other properties required for commercial adoption in existing catalytic cracking processes have not generally been obtained thereby.

It has also been proposed to activate natural mineral products including clays of the kaolin as well as those of the montmorillonite class by incorporating therein acid reacting materials and subjecting the admixture to roasting for effecting reaction between the acid and components of the mineral, followed by washing to remove soluble conversion products thus formed (U.S. Patent 2,582,956 of January 22, 1952).

Methods for activation of clays using liquid sulfuric acid are also known in which the raw clay is mixed with concentrated $H_2SO_4$ followed by aging or denning at elevated temperature to complete the sulfation reaction; the sulfated clay being then mixed with water to effect dissolution of soluble sulfates. It has also been proposed to subject sulfated clays to thermal decomposition at temperatures in excess of 1100° F. followed by treatment with acid solvent to remove alumina and other acid soluble components leaving a residue composed largely of silica.

In all of the processes as hereinbefore set out a substantial portion of the original alumina content of the clay is removed. By the method of the present invention, contact masses of improved properties, particularly advantageous for use as catalysts in cracking and other hydrocarbon conversion processes, are obtained, these masses having desirably good physical strength and hardness, and having among other desired catalytic properties desirably high catalytic activity which is exceptionally stable even in the presence of steam at high temperatures. By the method of the present invention, moreover, even raw kaolin clays of initially poor plasticity can be formed into granules and pellets having high resistance to crushing, abrasion and attrition, and even such raw kaolin clays, which are not brought to acceptable high catalytic activity levels by the usual or known methods of acid treatment, when processed in accordance with the present invention produce catalysts of satisfactory performance characteristics retaining their activity in use over a long period, even in the presence of steam and other deactivating influences encountered.

The desired catalysts are prepared, in accordance with the present invention, by subjecting a sulfated clay, particularly a sulfated kaolin, containing at least 15% $SO_4$ by weight of the clay (on 105° C. dry basis of clay) to treatment at elevated temperature under conditions effecting decomposition of the metal sulfates present therein and driving off the oxides of sulfur thereby formed as well as other volatiles present. For best results, particularly from the standpoint of obtaining catalysts producing lowest coke make in cracking of oils, as for gasoline production, the decomposition of the sulfate should be effected in the presence of steam, constituting at least 10% by volume of the gaseous atmosphere surrounding the clay under treatment. In many instances, even when desulfation is effected in the presence of steam, a subsequent steaming step may be found beneficial.

In the preferred practice of the invention decomposition of the clay sulfate is effected under reducing conditions, whereby oxides of sulfur are removed from the clay largely or even almost entirely as $SO_2$. Decomposition of the metal sulfates by chemical reduction takes place at considerably lower temperatures than those required for strictly thermal decomposition and the desulfated clays obtained have desirably higher surface area than those obtainable at such high decomposition temperatures. Moreover, the preferred reduction method is more readily controlled to give repeatedly products of consistently more uniform quality. No matter what method of decomposition is employed the final product should contain no more than 2% by weight $SO_3$ (ignited clay basis) and preferably lesser quantities.

Various methods are available for the initial preparation of the sulfated clay. A simple but practicable technique involves grinding of the raw clay and—preferably after washing and desilting to remove physically admixed non-clay materials—thereafter subjecting the same to thorough mixing with sulfuric acid, using a quantity of acid sufficient at least to react with part of the alumina content of the clay. The mixing of the clay and acid may be done in a pug mill or the materials may be previously admixed and the acid thoroughly incorporated with the clay in a pug mill or other suitable mixing device.

The acid serves to convert a portion of the alumina content of the clay to aluminum sulfate which forms a firm binder between the remaining clay particles. Subsequent decomposition of the sulfate does not destroy this bond so that physically strong pellets or other firm aggregates result. The bonding effect of the sulfation is evidenced with as little as 10% $H_2SO_4$ to the dry weight of the clay and with increasing quantities of acid, more alumina is reacted with accompanying tendency to produce stronger pellets up to the stoichiometric equivalent to the alumina. In general it is preferred to employ a quantity of acid furnishing 20 to 80% of $H_2SO_4$ to the dry weight of the clay. In operation of the sulfation step moderately to highly concentrated acid may be employed as from about 30% aqueous sulfuric acid up to 100% concentrated acid. By proper selection of the quantity and concentration of acid, an acid-clay mix of desired extrusion consistency can be provided which does not require any further adjustment of liquid content prior to extrusion. Thus, with typical kaolin clays this can be generally accomplished by mixing the clay with about 30 to 35% acid by volume of the clay. If the total liquid content provided by the acid employed results in too stiff a mix, it will be understood, that additional quantities of water may be added to adjust the mix to desired extrudable consistency.

After thorough mixing of the clay and acid to form a composition of extrudable consistency, the mix is extruded through die plates having orifices of desired size and the extruded strands are cut or broken to desired lengths. Conventional finished clay catalyst pellets, after calcination, are generally cylindrical and of about 2 to 6 millimeters diameter and of about the same length. The wet pellets are accordingly produced so as to fall in the desired size range on subsequent treatment including drying and calcination.

While extrusion has been particularly described as a convenient manner of producing the desired hard catalyst pellets, it will be understood that other methods of pelleting might be employed including casting, compacting, prilling or other known techniques used in tablet and pellet formation. The catalyst may be formed into other than cylindrical pellets, such as discs, rings, spheres or other desired shapes.

To complete the reaction between the acid and the clay, the formed pellets are subjected to aging or heating. For instance, the pellets may be placed in an oil bath at about 250° F. to 400° F. or higher, up to the decomposition temperature of the acid, and retained therein for a time adequate to assure substantially complete reaction of the sulfuric acid. Such heating of the clay is generally known in the art as "denning." Alternatively, if desired, the heating may be accomplished in air (or other gaseous atmosphere) instead of in the oil bath, but the oil bath usually provides a ready means for obtaining uniform heating.

The sulfated clay pellets are now ready for the desulfation treatment which may be accomplished in any one of a number of ways but not necessarily with equal results. In the preferred practice desulfation is effected at temperatures above 750° F. and in the presence of a reducing agent which converts the sulfate radical or the $SO_3$ released therefrom at the elevated temperature, to a lower oxide of sulfur, which is driven off. Reducing agents that can be employed for this purpose include gases or vapors such as hydrogen, carbon monoxide, hydrogen sulfide, sulfur, ammonia, methane. Not all of these are equally effective under the same temperature conditions. Hydrogen sulfide, for example, works effectively at a minimum temperature in the order of 750° F. to 800° F. while methane requires a considerably higher temperature in the order of 1400–1450° F. All of the other named reducing agents are effective at a minimum temperature between 1000 and 1400° F. Desulfation can be carried out in the absence of reducing agent, and particularly in an atmosphere containing over 10% and at least 25% steam, but thermal desulfation does not proceed at a reasonably rapid rate below 1500° F., requires considerably greater heat input, and is difficult to control because of the possibility of inducing an exothermic reaction, such as in crystal transformation, which might take place at these high temperatures.

The manner of carrying out the desulfation is important from the standpoint of the ultimate physical and catalytic properties of the finished catalyst pellets. Thus, it has been found that the presence of steam during the reduction or other decomposition of the sulfate in the clay results in the production of catalyst of reduced coking tendency; that is, the catalyst thus obtained shows comparatively better gasoline/coke ratios in hydrocarbon cracking under conventional operating conditions than similarly prepared kaolin catalysts in which steam is not employed. As a possible alternative the decomposition of the sulfate, particularly by reduction, might be carried out in the absence of steam, and the desulfated clay then subjected to steaming at a temperature above about 1000° F. to about 1550° F. or short of that which would cause initiation of sintering of the clay. This subsequent steaming step also tends to reduce the coking tendency of the catalyst but it is nevertheless preferred to employ steam during the decomposition of the sulfate, not only because of convenience of operation, but also because repeated production of catalysts of lowest coking tendency is thus better assured.

In the preferred operation, desulfation of the sulfated kaolin pellets is carried out at temperatures in the range of 1100–1600° F., better at 1350° F. or above, employing a reducing gas mixture composed of steam and hydrogen. At temperatures of 1300° F. and above the gas may contain as little as 1 mol percent hydrogen and be effective. At lower temperatures, higher concentrations of reducing agent in the gas mixture are required. Instead of or in addition to the hydrogen, carbon monoxide may be employed in about the same total ratio in the mixture of reducing gas to steam as hereinbefore described in the case of hydrogen alone. Carbon monoxide alone is less efficient than hydrogen at temperatures below 1200° F.

When hydrogen sulfide is used as the reducing gas, with or without the simultaneous presence of steam, lower temperatures are effective from about 750° F. To assure the production of catalysts of low coking tendencies, however, with perhaps some gain in catalyst activity, the desulfated clay should be subjected to a subsequent steaming operation at temperatures above 1350° F. and preferably at 1500–1600° F.

When hydrogen sulfide is employed at temperatures of 1050° F. or higher any iron present in combined form in the clay lattice may be freed and thereby activated. In such case it is best to remove the liberated iron, which can be readily accomplished by treatment with $NH_4Cl$ vapor.

In general whenever reduction is carried out in the absence of steam, the subsequent steaming should be carried out at above 1350° F. and preferably in the 1400–1600° F. temperature range using 100% steam or diluted with up to about 70–80% inert gas.

As indicated above, decomposition of the sulfate can be effected in a steam atmosphere without reducing agents if at sufficiently high temperature, but not necessarily with equal facility or effectiveness, as when using reducing agents.

In the reduction process of decomposing sulfate the initial reaction illustrated in Equation I below is endothermic; the second stage Reaction II is exothermic.

(I) $\quad Al_2(SO_4)_3 \rightarrow Al_2O_3 + 3SO_3$
(II) $\quad 3SO_3 + 3H_2 \rightarrow 3SO_2 + 3H_2O$ Hence, once the reaction illustrated in Equation I has been initiated, the reduction of the $SO_3$ supplies at least a part of the heat required to further decomposition of the aluminum sulfate.

EXAMPLE I

A Georgia clay was sulfated by treatment with 66° Bé. acid, extruded to pellets, and oil denned at about 300° F. for four hours. The sulfated catalyst contained 36.8% by weight (on 105° C. dry sulfated clay basis) $SO_4$ ion, showed a total ignition loss of 50.8% (at 1800° F. for 2 hours) and contained 64.1% of $SO_3$ on such ignited basis.

The above clay was desulfated by treatment at 1350° F. for four hours in 10% $H_2$ and 90% steam. The properties of the catalyst obtained are summarized in the table below:

Table 1

Physical properties:

| | |
|---|---|
| Surface area, sq. m./g | 145 |
| Bulk density, kg./l | 0.78 |
| Hardness index | 89 |
| Jet attrition, percent loss | 56 |
| Knife edge hardness (gm.) | 13,000+ |

The hardness index (H.I.) of the catalyst was determined by a standard test designed as an empirical measure of frictional attrition. In this test the catalyst pellets of #3 to #5 screen size are rotated with steel balls in a cylindrical can on its longitudinal axis at constant speed for an hour. The hardness index (H.I.) is then computed by weighing the catalyst retained on a #6 screen, thus:

$$HI = \frac{\text{Wt. \#6 fraction} \times 100}{\text{Wt. of original (\#3 to \#5) sample}}$$

Knife-edge hardness is determined by loading a knife edge (of the type used in analytical balances), placed upon the cylindrical surface of the pellet, until the pellet breaks.

Jet attrition is determined by forcing a jet of air through a layer of the catalyst in an inverted Erlenmeyer flask for one hour to cause the pellets to strike the walls and bottom of the flask. The loss in weight of fines blown out by the jet is recorded as "jet attrition percent loss."

The catalytic behavior of the above catalyst was determined by the standard CAT-A method (see "Laboratory Method for Determining the Activity of Cracking Catalysts," by J. Alexander and H. E. Shimp, page R537, National Petroleum News, August 2, 1944) in cracking of a light gas oil at standardized conditions, with the following results:

| | |
|---|---|
| Gasoline, vol. percent charge | 36.2 |
| Coke, wt. percent charge | 4.0 |
| Gas, wt. percent charge | 8.7 |
| Gas gravity (air=1) | 1.41 |

A fixed bed pilot plant run on 56–77% East Texas gas oil at 900° F. and at a space rate giving 50% (volume) conversion, produced the following results:

| | |
|---|---|
| $C_5+$ gasoline (385° F. at 90%) vol. percent | 36.2 |
| Gas oil, vol. percent | 50.00 |
| $C_4$ cut, vol. percent | 12.6 |
| Dry gas, wt. percent | 5.9 |
| Coke (incl. 7% $H_2$) wt. percent | 3.7 |
| Octane rating $F_1$ clear | 92.4 |
| Space rate for 55 vol. percent conv. at 5 vol. cat./oil ratio (calc.) | 3.0 |

The space rate shown above for 55 vol. percent conversion is 2.4 times that required for like conversion at the same temperature and cat./oil ratio when using commercial acid-activated bentonite catalyst (26 CAT-A index).

By further steaming of the above desulfated catalyst at above 1350° F. additional reduction in coke-making tendencies is effected. Thus, four hours' steaming of the above previously reduced clay at 1450° F. in 100% steam effected a 45% reduction in coke-make (CAT-A) with only about 6% lowering of gasoline yield.

The original sulfated clay was further tested by desulfation in 10% hydrogen and 90% steam in a series of runs of various temperatures above 1350° F. and up to 1650° F. It was found that with increased severity of desulfating conditions (higher temperature or longer time) the surface area of the catalyst was decreased with a significant reduction in coke-making tendencies at some sacrifice in gasoline activity level. For a given temperature, for any selected reducing atmosphere the surface area passes through a maximum value, falling off with extended time of heat treatment after substantially all of the sulfate has been removed, while the coking tendency steadily is decreased as the treating time is prolonged.

In general a maximum treatment temperature of about 1500° to about 1550° F. is preferred since at above 1600° F. the reduction in coke making properties is accompanied by a disproportionate loss in gasoline producing activity. The same applies for subsequent steam treatment of already reduced (desulfated) catalyst.

EXAMPLE II

Edgar plastic kaolin (EPK) obtained from Putnam County, Florida, was sulfated to produce pellets containing 36.2 parts by weight added $H_2SO_4$ for each 100 parts of clay (105° C. dry basis).

The sulfated pellets were heated to 700° F. in a stream of dry nitrogen, then hydrogen and steam were cut in and the temperature permitted to rise to 1350° F. and held at approximately that temperature for four hours in the 90% $H_2O$–10% $H_2$ atmosphere.

The reduced pellets from the above treatment showed the following physical characteristics:

| | |
|---|---|
| Surface area, m.²/g | 79 |
| Bulk density, kg./l | 0.98 |
| Hardness index | 96 |
| Jet attrition percent loss | 27 |
| Knife edge hardness (gm.) | 13,700+ |

EXAMPLE III

The starting sulfated kaolin described in Example I was reduced in a number of separate runs respectively with methane and ammonia at 1350 and 1450° F. and for 1, 2 and 4 hours. The same effects of temperature and time were observed as in the hydrogen treatments of Example I. Reduction of sulfated kaolin at 1450° F. for four hours in 5% methane and 95% nitrogen produced a catalyst giving by the CAT-A method 70% higher coke-make at approximately the same gasoline level (3% lower) than one treated for the same time and at the same temperature in 5% methane, 95% $H_2O$.

The catalyst prepared by reduction of the above described sulfated kaolin in 7% $NH_3$ and 93% $H_2O$ at 1450° F., for four hours gave in a CAT-A cracking run a yield of 32.4% gasoline by volume of charge and made 2.6% by weight coke. Reduction of the sulfated clay in the same ammonia gas composition and at the same temperature for 1 and 2 hours, respectively, produced catalysts of higher coking tendency at about the same or slightly higher gasoline level, as was also the case when a portion of the steam was substituted by nitrogen (7% $NH_3$, 19% $H_2O$, 74% $N_2$).

EXAMPLE IV

The sulfated clay pellets described in Example I above were subjected to reduction for 12 hours at 1250° F. in a gas of the following composition which was charged at the rate of 5 mols $CO+H_2$ per mol $SO_3$ in the clay:

| | Mol percent |
|---|---|
| $CO_2$ | 6 |
| CO | 3 |
| $H_2$ | 2 |
| $N_2$ | 44 |
| $H_2O$ | 45 |

The pellets were thereafter treated at the same temperature in 50% hydrogen and 50% dry inert gas (nitrogen). The properties of the desulfated catalyst pellets are tabulated below and compared with a sample similarly prepared and thereafter subjected to 100% steam for four hours at 1350° F.

Table 2

| | After reduction | After steam |
|---|---|---|
| Bulk density, kg./l | 0.77 | |
| Hardness index | 87 | |
| Jet attrition percent loss | 40 | |
| Surface area, m.²/g | 131 | 108 |
| $SO_3$ content, weight percent (ign. basis) | 0.6 | |
| CAT-A yields: | | |
| Gasoline, volume percent chg. | 29.9 | 32.3 |
| Coke, weight percent | 3.8 | 2.7 |
| Gas, volume percent | 8.3 | 6.1 |
| Gas, gravity | 1.24 | 1.36 |

EXAMPLE V

The desulfation of the clay described in the preceding example was modified on another batch using the same reducing gas composition at 1250° F. for 9 hours charged at the rate of 3.8 mols $CO+H_2$ per mol $SO_3$ in the clay, followed by subsequent clean-up treatment in 50% hydrogen. A portion of this desulfated batch was given an after-treatment at 1350° F. for four hours in 100% steam. The hardness properties of the catalyst compared favorably with that in the preceding example; however, it showed a somewhat higher coking tendency in the CAT-A test. The catalyst was employed in cracking of a gas oil fraction (56–77 vol. percent) of an East Texas crude oil, with the following results:

Table 3

|  | Before 100% steam treat | After 100% steam treat |
|---|---|---|
| Conversion, volume percent | 50 | 50 |
| $C_5+$ gasoline, volume percent (385° F. at 90%) | 35.8 | 36.3 |
| Catalytic gas oil, vol. percent | 50.0 | 50.0 |
| $C_4$ cut, volume percent | 5.3 | 5.2 |
| Coke (incl. 7% $H_2$), weight percent | 4.6 | 3.8 |
| Octane $F_1$ clear |  | 92.8 |
| Physical properties of catalyst: |  |  |
| Jet attrition, weight percent loss | 27 |  |
| Hardness index | 92 |  |
| $SO_3$, weight percent (ign. basis) | 1.5 |  |

Obviously many modifications and variations of the present invention as hereinbefore set forth may be made without departing from the spirit and scope thereof and therefore only such limitations should be imposed as are indicated in the appended claims.

What is claimed is:

1. The method of preparing active cracking catalysts from kaolin clays which comprises sulfating such clay to a sulfate content of at least 10% on the dry weight of the clay and thereafter subjecting the clay to treatment including decomposition of the metal sulfates formed therein by such sulfating, said decomposition being effected by reduction of such metal sulfates in a gaseous atmosphere including a reducing gas and at elevated temperature in the range of 750–1600° F.

2. The method as defined in claim 1 wherein the decomposition of the sulfate is carried out on the clay in pelleted form.

3. The method as defined in claim 1 wherein such reduction is effected in the presence of hydrogen.

4. The method as defined in claim 1 wherein said gaseous atmosphere is one comprising hydrogen and steam and said elevated temperature is in the range of 1100–1600° F., and following said reduction the clay is subjected to further steaming at elevated temperature.

5. The method as defined in claim 2 wherein the clay is further subjected to steaming at a temperature above 1000° F. subsequent to the reduction step.

6. The method of preparing hard, active contact masses from kaolin clays which comprises sulfating such clay to a sulfate content of at least 15% $SO_4$ on the dry weight of the clay, pelleting the sulfated clay, subjecting the formed pellets to treatment effecting decomposition of the metal sulfates formed in the clay by said sulfating, with evolution of oxides of sulfur to a residual sulfate content in the clay on ignited basis below 2% by weight determined as $SO_3$, said treatment including contact of the sulfated clay with a normally gaseous reducing agent at a temperature above 750° F.

7. The method as defined in claim 6 wherein steam is employed during treatment with said reducing agent.

8. The method as defined in claim 6 wherein the pellets after reduction are subjected to steaming at a temperature of at least 1350° F.

9. The method as defined in claim 6 wherein the treatment with a reducing agent is effected in an atmosphere of steam and hydrogen at a temperature in the range of 1100–1600° F.

10. The method as defined in claim 6 wherein the reducing agent comprises carbon monoxide and said reduction is effected at a temperature in the range of 1100–1600° F.

11. The method as defined in claim 6 wherein the reducing agent comprises methane and said reduction is effected at a temperature of at least 1400° F.

12. The method as defined in claim 6 wherein said reducing agent comprises hydrogen sulfide.

13. The method as defined in claim 7 wherein the pellets after reduction are subjected to steaming in a 20–100% $H_2O$ atmosphere at a temperature of at least 1000° F.

14. The method of preparing hard, active catalyst pellets from kaolin clays which comprises treating the clay with sulfuric acid to incorporate therewith at least 15% $SO_4$ on the dry weight of said clay, forming the treated clay into pellets, aging the pellets at a temperature of at least 250° F. and below the decomposition temperature of $H_2SO_4$ to further conversion of the alumina in the clay to sulfate, and thereafter subjecting the pellets to treatment with a normally gaseous reducing agent at a temperature above 750° F., to effect reduction of the aluminum sulfate in the clay and accompanying release of sulfur oxides therefrom.

15. The method as defined in claim 14 wherein said reduction is carried out in a gaseous atmosphere comprising at least 10% by volume steam.

16. The method of preparing hard, active catalyst pellets from kaolin clays which comprises thoroughly incorporating concentrated sulfuric acid in an amount equivalent to at least 15% $SO_4$ by weight of the dry clay in the clay, extruding the acid-clay mix to form pellets, heating the pellets for sufficient time to effect substantially complete utilization of the acid by reaction with the alumina in the clay, and thereafter decomposing the sulfate of alumina thus produced by treatment of the clay pellets at a temperature in the range of 1100–1600° F. in a reducing gas mixture comprising steam and hydrogen.

References Cited in the file of this patent

UNITED STATES PATENTS

| | | |
|---|---|---|
| 1,781,265 | Baylis | Nov. 11, 1930 |
| 2,044,341 | Wollner | June 16, 1936 |
| 2,192,000 | Wilson | Feb. 27, 1940 |
| 2,438,451 | Owen | Mar. 23, 1948 |
| 2,472,489 | Pierce | June 7, 1949 |
| 2,477,639 | Mills | Aug. 2, 1949 |
| 2,485,626 | Mills | Oct. 25, 1949 |
| 2,671,058 | Mickelson | Mar. 2, 1954 |

FOREIGN PATENTS

| | | |
|---|---|---|
| 239,169 | Great Britain | July 6, 1926 |